(12) United States Patent
Laux

(10) Patent No.: US 11,053,364 B2
(45) Date of Patent: Jul. 6, 2021

(54) OPTIMIZED SIZING FOR CARBON FIBER-SHEET MOLDING COMPOUND

(71) Applicant: Magna Exteriors Inc., Concord (CA)

(72) Inventor: Joseph J. Laux, Ermatingen (CH)

(73) Assignee: Magna Exteriors Inc., Concord (CA)

( * ) Notice: Subject to any disclaimer, the term of this patent is extended or adjusted under 35 U.S.C. 154(b) by 40 days.

(21) Appl. No.: 16/336,601

(22) PCT Filed: Sep. 27, 2017

(86) PCT No.: PCT/IB2017/055937
§ 371 (c)(1),
(2) Date: Mar. 26, 2019

(87) PCT Pub. No.: WO2018/060902
PCT Pub. Date: Apr. 5, 2018

(65) Prior Publication Data
US 2019/0225759 A1    Jul. 25, 2019

Related U.S. Application Data

(60) Provisional application No. 62/400,380, filed on Sep. 27, 2016.

(51) Int. Cl.
| | | |
|---|---|---|
| *C08J 5/06* | (2006.01) | |
| *C08J 5/04* | (2006.01) | |
| *B29C 70/18* | (2006.01) | |
| *C08G 18/67* | (2006.01) | |
| *C08J 5/24* | (2006.01) | |
| *C08L 63/10* | (2006.01) | |
| *D06M 15/55* | (2006.01) | |
| *C08G 18/76* | (2006.01) | |
| *D06M 15/51* | (2006.01) | |
| *C08L 63/00* | (2006.01) | |
| *C08L 75/14* | (2006.01) | |
| *D06M 101/40* | (2006.01) | |
| *B29K 307/04* | (2006.01) | |

(52) U.S. Cl.
CPC ............... *C08J 5/042* (2013.01); *B29C 70/18* (2013.01); *C08G 18/672* (2013.01); *C08G 18/7664* (2013.01); *C08J 5/06* (2013.01); *C08J 5/24* (2013.01); *C08L 63/00* (2013.01); *C08L 63/10* (2013.01); *C08L 75/14* (2013.01); *D06M 15/51* (2013.01); *D06M 15/55* (2013.01); *B29K 2307/04* (2013.01); *C08J 2363/00* (2013.01); *C08J 2375/14* (2013.01); *C08J 2463/00* (2013.01); *C08J 2475/14* (2013.01); *D06M 2101/40* (2013.01); *D06M 2200/40* (2013.01)

(58) Field of Classification Search
CPC ..... C08J 5/047; C08J 5/042; C08J 5/06; C08J 5/24; C08J 5/18; C08G 18/672; C08L 63/10; B29K 2307/04; D06M 2101/40; D06M 2200/40; B29C 70/18; H05K 9/009; H05K 9/0098; H05K 9/0081; C08K 9/04; C08K 3/04; C09C 3/08
USPC .......................................................... 523/202
See application file for complete search history.

(56) References Cited

U.S. PATENT DOCUMENTS

| | | | | |
|---|---|---|---|---|
| 2004/0197565 | A1* | 10/2004 | Sugiura | D06M 7/00 428/413 |
| 2005/0281998 | A1* | 12/2005 | Baker | C08L 29/04 428/292.1 |
| 2013/0248241 | A1 | 9/2013 | Harney | |
| 2015/0034243 | A1* | 2/2015 | Haveman | C08G 18/329 156/331.1 |
| 2015/0247025 | A1 | 9/2015 | Ichikawa et al. | |
| 2017/0305075 | A1* | 10/2017 | Hartman | H01B 1/24 |

OTHER PUBLICATIONS

International Search Report for International Application No. PCT/IB2017/055937, Filed Sep. 27, 2017.

* cited by examiner

*Primary Examiner* — Hannah J Pak
(74) *Attorney, Agent, or Firm* — Warn Partners, P.C.

(57) ABSTRACT

There is provided a carbon fiber sheet molding composition including a vinyl ester resin type system. The carbon fiber distribution is random. The carbon fiber length is from about 0.5 inches to two inches. The carbon fiber loading is from about 35% to 65%, and includes epoxy sized carbon fiber and vinyl sized carbon fiber effective to achieve predetermined significant increase in desired mechanical properties.

15 Claims, No Drawings

OPTIMIZED SIZING FOR CARBON FIBER-SHEET MOLDING COMPOUND

CROSS-REFERENCE TO RELATED APPLICATIONS

This application is a National Stage of International Application No. PCT/IB2017/055937, filed Sep. 27, 2017, which claims the benefit of U.S. Provisional Patent Application No. 62/400,380, filed Sep. 27, 2016. The disclosures of the above applications are incorporated herein by reference.

FIELD OF THE INVENTION

The present invention relates to a sheet molding composition useful for components in a vehicle such as lightweight, strong liftgates.

BACKGROUND OF THE INVENTION

Carbon fiber-sheet molding compounds (CF-SMCs) are generally known. The current practice is to use 100% industrial heavy tow carbon fiber with epoxy sizing. In addition, production of CF-SMC from low cost industrial heavy tow carbon fiber is very difficult. All the focus has been on finding a way to cut the industrial heavy tow carbon fiber; not on optimizing the properties of CF-SMC using chopped industrial heavy tow carbon fiber. Therefore, there remains a need in the art for effectively producing CF-SMC while optimizing the desired mechanical properties of the final CF-SMC.

In addition, managing electric fields generated in vehicles has long been a consideration when building vehicles with internal combustion engines. Any time current is generated in an electrical system, there is also a subsequent electric field related to the current generation. These fields can interfere with other electrical components and systems in a vehicle.

Certain electrical components are more sensitive to the fields than others. For instance, in operating a vehicle radio on AM or FM bands, spark plug interference is prevalent at times. Resistance spark plugs knocks down the interference as well as using spark plug wires designed to reduce background electrical noise.

As vehicle systems and society in general become increasingly reliant on electrical controls and monitoring cages and systems, the need to further manage and limit electromagnetic interference has also become much more important and even critical to ensuring correct operation of electrical devices in or in close proximity to the vehicle.

With the advent of electric hybrid and pure electric powered vehicles, the current used in such vehicles is magnitudes more than used in conventional vehicles. The motors used and the batteries, wires, relays solenoids and other components must be extremely robust in order to effectively and reliably handle the electrical energy necessary to power and run the systems in the vehicle. Therefore, the electric fields produced by these systems have increased. While modern engineering and materials have helped control some of the electrical field emissions, there remains a need to further control and or shield or isolate gauges, radios, lighting, and occupants from the electrical fields generated.

In particular, most EV batteries, battery management systems, traction motor controllers and DC-DC converters are connected to devices or are devices that are switching high power (up to 100 kW or more) at high frequencies (20-50 kHz). This results in electromagnetic fields, at these frequencies and harmonics, that may radiate from the devices and these radiations could interfere with safety, communication, and entertainment equipment. This could occur both on board and off board the vehicle. The allowable level of emissions is controlled through regulation (e.g., FCC) and product performance specifications.

Standard practice in enclosure design is to use metals or coat plastic or composite enclosures with metal. Semi-structural battery housings used in these vehicles have used glass reinforced SMC with a shielding layer, typically copper. This is a robust yet expensive and heavy solution. Therefore, there remains a need in the art to replace heavy and expensive copper shielding designs with a more cost effective and lighter material without sacrificing shielding characteristics.

SUMMARY OF THE INVENTION

There is provided a carbon fiber sheet molding composition (CF-SMC) with significantly improved predetermined mechanical properties. The CF-SMC in accordance with the broad aspects of the present invention includes an effective amount of carbon fiber to achieve the desired properties. The carbon fiber loading is from about 35% to 65%, typically, 45% to 55%, preferably, 50%, by weight.

In accordance with an embodiment of the present invention, there is provided an electromagnetic shielding composition. The electromagnetic shielding composition in accordance with the broad aspects of the present invention includes from about 40% to 60% by volume of a Sheet Molding composition filled with an effective amount of carbon fibers for shielding of electromagnetic radiation from the electrical systems in an at least partially electrically driven vehicle.

Also provided in accordance with an embodiment of the present invention is a process for making an electromagnetic shield for a component of an electrical vehicle. In the process of the present invention, an electromagnetic shielding composition in the form of a sheet is formulated. The electrical shielding composition includes from about 40% to 60% by volume of a sheet molding composition filled with an effective amount of carbon fibers for shielding of electromagnetic radiation from the electrical systems in an at least partially electrically driven vehicle. Thereafter, an electromagnetic shield for a part is produced by forming and curing the sheet of electromagnetic shielding composition into a shape effective for following the form of a component to be shielded.

Using carbon fiber as a reinforcement in place of glass and reduce the mass of the part through the lower density and higher strength of carbon fiber. The present invention also eliminates the copper cladding in prior designs by taking advantage of the potential of carbon fiber to attenuate EMI. This would further reduce mass of parts manufactured and partially off-set the cost of the carbon fiber.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

In accordance with the present invention, there is provided a carbon fiber sheet molding composition (CF-SMC) with significantly improved predetermined mechanical properties. The CF-SMC in accordance with the broad aspects of the present invention includes an effective amount of carbon fiber to achieve the desired properties. The carbon fiber loading is from about 35% to 65%, typically, 45 to 55%, preferably, 50%, by weight. The carbon fiber distribution is random or amorphous. The carbon fiber size (length) is from about 0.5 inches to 2 inches, typically, 1 to 2 inches, preferably, 1 inch. The SMC is preferably a vinyl ester type based sheet molding composition.

The present invention uses a mixture of industrial heavy tow carbon fiber to obtain predetermined significantly improved mechanical properties. Instead of using only epoxy sizing carbon fiber, which is conventional, there is provided a composition of both epoxy sizing carbon fiber and vinyl ester sizing carbon fiber. By way of example, inventive mixtures are from about 40%/60% to about 60%/40% (epoxy:vinyl ester and vinyl ester:epoxy sizing carbon fibers), preferably, 50%/50%. In all cases, there is a significant increase in desired mechanical properties of the inventive examples versus the comparative examples that used carbon fillers with 100% epoxy or 100% vinyl ester sizing. Other sizing formulations suitable for use with the chosen resin in optimizing predetermined mechanical and processing properties depending on the application are contemplated without departing from the scope of the present invention.

The carbon fibers selected for the present invention are those suitable for formulation with the CF-SMC and resin system chosen and which provide suitable predetermined desired properties. The carbon fiber also has predetermined sizing and large tow suitable for formulation with the CF-SMC and resin system chosen and which provides suitable predetermined desired properties. Typically, the carbon fiber is sized specifically for epoxy, and another carbon fiber is sized specifically for vinyl ester. The amount of carbon fiber material in the CF-SMC material is generally, 35% to 65% by weight, typically, 45% to 55% by weight, preferably, 50%.

A preferred material for use in the present invention is a Panex® 35 Continuous Tow (50K) 35 carbon fiber material (or Zoltek™ "PX35") available from Zoltek Companies, Inc. St. Louis, Mo. This material is a 50K filament fiber manufactured from polyacrylonitrile precursor. The material has a tensile strength of 600 KSI, a tensile modulus of 35 Msi, an electrical resistivity of 0.00061 ohm-in, a fiber diameter of 0.283 mils, a carbon content of 95%, and a yield of about 400 ft/lb. Panex® 35 is available in a variety of sizing depending on the particular application. Preferred materials for use in sizing this carbon fiber (epoxy carbon fiber sizing and vinyl ester carbon fiber sizing) are sizing chemicals available from DSM Noxiol Division in Het Overloon, the Netherlands, Huntsman Corporation in Alvin, Tex., Momentive (aka Hexion) in Columbus, Ohio, and etc.

A particularly preferred carbon fiber material for use in the present invention is a Panex® 35 Continuous Tow (50K) Sizing 11 carbon fiber with epoxy sizing material available from Zoltek Companies, Inc. St. Louis, Mo. Another particularly preferred carbon fiber material for use in the present invention is a Panex® 35 Continuous Tow (50K) Sizing 72 carbon fiber with vinyl ester sizing material available from Zoltek Companies, Inc. St. Louis, Mo.

A resin system is selected for the present invention suitable for formulation of the CF-SMC with predetermined carbon fiber with sizing materials and which provides suitable predetermined desired properties.

A preferred resin system includes a vinyl ester resin, e.g., a fully formulated vinyl ester resin based system. Another preferred material for use in the resin system includes an aromatic polymeric isocyanate based on diphenylmethane-diisocyanate. A most preferred resin system includes a predetermined mixture of at least a fully formulated vinyl ester resin and a polymeric methylene diphenyl isocyanate (PMDI).

A particularly preferred resin system material for use in the present invention is an Arotran™ 300, fully formulated vinyl ester resin based system available from Ashland, Inc., Dublin, Ohio. Typically, the material has significantly higher tensile and flex properties than glass-fiber materials. Typically, the material has a tensile strength of about 200 Mpa, flex strength of about 480 Mpa, tensile modulus of about 35 Gpa and flex modulus of about 30 Gpa. Another particularly preferred material for use in the resin system of the present invention is Mondur™ MR, a polymeric methylene diphenyl isocyanate (PMDI) material available from Covestro LLC, Pittsburgh, Pa. Typically, the PMDI has a NCO weight of at least 31 wt.-%, preferably 31.5%, viscosity at 25° C. of 150-250 MPa-s, preferably 200 mPa-s, functionality of 2.8, acidity of 0.01-0.03 wt.-%, specific gravity at 25° C. of 1.24, flash point PMCC of 199, density at 25° C. of 10.3 lb/gal, and equivalent weight average of at least 132, preferably 133. A most particularly preferred resin system according to the present invention is a predetermined mixture of Arotran® 300 and Mondur MR® materials.

A particular preferred CF-SMC compound is a combination of the resin system, (Arotran 300 mixed with Mondur MR), and carbon fiber (Panex® 35 Sizing 11 and Panex® 35 Sizing 72, having a fiber length of about 1 inch). The amount of carbon fiber material in the CF-SMC material (e.g., 50% by weight) in accordance with the present invention significantly improves mechanical properties. The carbon fiber is sized specifically for vinyl ester (e.g., Panex® Zoltek 72 sized carbon fiber). Due to the amount of carbon fiber in the CF-SMC material, e.g., 50% by weight, a predetermined operable mixture of 11 size (sized for epoxy) and 72 size (sized specifically for vinyl ester) is used, preferably in a 50/50% mixture, rather than only using the full percentage by weight, e.g., full 50%, of 11 size. The vinyl ester sized carbon fiber is 25% 11 size and 25% 72 size (versus 50% 11 size) in an exemplary formulation of the present invention.

Due to the relative high cost of carbon fiber, compared to glass, and to the resins used in the SMC, it is very important to translate the maximum amount of mechanical potential from the virgin carbon fiber (e.g., Zoltek Panex 35 has a Tensile Modulus of 242 GPa and a Tensile Strength of 4137 MPa).

Hence, the present invention has better economic impact too because the invention achieves higher mechanical properties (e.g., more efficient translation of carbon fiber potential, at equal loadings on the basis of weight %) by simply running a 50/50 mixture of 11 and 72 sizing.

It is understood that any other sizings are contemplated suitable for maximizing mechanical properties depending on the application without departure from the scope of the present invention.

Other fillers, additives and components may be included in minor amounts provided they do not affect the desired properties of the present invention.

The sheet molding composition of the present invention provides molding of complicated shape applications such as liftgates.

The material can be compatible with epoxy resins and unidirectional fiber formats for local reinforcement. It also can be E-coat temperature capable with long term stability.

The sheet molding composition, e.g., electromagnetic shielding composition, in accordance with the broad aspects of the present invention, includes from about 40% to 60% by volume of a Sheet Molding composition filled with an effective amount of the carbon mixture. Generally, from about 60% to about 40% of a shielding carbon fiber mixture. Typically, from about 45% to about 55% SMC blended with from about 55% to about 45% carbon fiber mixture is used with a particularly preferred ratio of about 50% SMC and 50% carbon fiber with the sizings mixture. Carbon fibers selected for an embodiment of the present invention are those suitable for formulation with the SMC chosen and which provide suitable shielding properties. A preferred SMC compound is a Magna EPIC Blend™ SMC composition available from Magna International, Novi, Mich. The SMC is a vinyl ester type sheet molding composition. Other fillers, additives and components may be included in minor amounts provided they do not affect the physical and particularly the electric field shielding properties of the present invention.

The properties of the resulting composition are set forth below in Table 1:

TABLE 1

Properties of EMI SMC of the present invention:

| | |
|---|---|
| Specific Gravity | 1.41 |
| Carbon Fiber | 50% (by weight) |
| Fiber Length | 25 mm |
| Fiber Orientation | random |
| Tensile Modulus | 30 GPa |
| Tensile Strength | 200 MPa |
| Flexural Modulus | 26 GPa |
| Flexural Strength | 460 MPa |
| Moisture Absorption | <0.2% |
| Mold Shrink | 0.0001 mm/mm |

The carbon fiber has predetermined sizing and large tow suitable for formulation with the SMC chosen and which provides suitable predetermined desired properties. A preferred material for use in the present invention is a Panex® 35 continuous Tow (50K) 35 carbon fiber material available from Zoltek Companies, Inc. St. Louis, Mo. This material is a 50 K filament fiber manufactured from polyacrylonitrile precursor. The material has a tensile strength of 600 KSI, a tensile modulus of 35 Msi, an electrical resistivity of 0.00061 ohm-in, a fiber diameter of 0.283 mils, a carbon content of 95%, and a yield of 400 ft/lb.

In one embodiment, the fiber is operably cut to predetermined length and impregnated with at least a SMC resin (e.g., vinyl ester) formulation. Preferably, Zoltek's Panex® 35 carbon fiber is combined with the predetermined SMC. The compound is particularly suited for compression molding, and, preferably is a vinyl ester suitable for structural components.

The present invention provides several advantages, including, lower cost carbon fiber SMC, provides electromagnetic interference shielding properties, high performance, high mechanical properties, high heat resistance, allows production of parts and sub-systems for automotive, commercial truck and etc, allows lighter weight products for cost-effective energy/environmental requirements, structural and semi-structural applications with complex geometry, and/or lightweight structural applications, including, electrical vehicle battery try enclosures and for molding of complex shape parts, liftgates, etc.

According to an embodiment of the present invention, there is provided from about 40% to 60% by volume of a mono layer sheet molding composition (SMC) filled with an effective amount of a mixture of carbon fibers having both epoxy sizing and vinyl ester sizing for use in improved mechanical properties for structural parts such as liftgates. Shielding of electromagnetic radiation from the electrical systems in an at least partially electrically driven vehicle is also contemplated, wherein the carbon fibers are from about 1 inch to about 3 inches in length and are amorphously distributed throughout the composition.

In accordance with the process aspects of one embodiment of the present invention, there is provided a process for making an electromagnetic shield for a component of an electrical vehicle. The first step is to provide an electromagnetic shielding composition in the form of a sheet. Blending of SMC and chopped carbon fibers are used in the present invention. As set forth above, electrical shielding composition including from about 40% to 60% by volume of a sheet molding composition is filled with an effective amount of carbon fibers for shielding of electromagnetic radiation from the electrical systems in an at least partially electrically driven vehicle and is formed into a sheet. The sheet is thereafter formed into a predetermined shape and then cured at a tool temperature of about 150 degrees C. The sheet of electromagnetic shielding composition is formed into a shape effective for following the form of a component to be shielded.

The component to be shielded is either an electrical component to be installed in a vehicle such as a radio, gauge, control unit or the like which would have a shielded housing. Or the shielding may be formed in a shape to cover a motor, feed wire, battery, a group of batteries, a wire, a wiring harness or other heavy current using systems. It may be particularly desirable to provide contoured shields for control units in the electric vehicle such as an engine control unit, a computer device, a transmission control unit, a charging control unit.

In accordance with the process aspects of one embodiment of the present invention, in a particularly preferred embodiment of the present invention the process for manufacturing the CF-SMC includes adding a predetermined percentage by weight, e.g., 50% by weight, of carbon fiber with predetermined sizing to a predetermined percentage by weight, e.g., 50% by weight, of resin. The carbon fiber includes an epoxy sized carbon fiber and a vinyl ester sized carbon fiber. Carbon fiber filaments are operably processed to a predetermined length, e.g., 1 inch. The resin was operably produced with a predetermined mixture of fully formulated vinyl ester resin, e.g., 95 parts, and PMDI, e.g., 5 parts. Adding the carbon fiber materials to the resin significantly improves mechanical properties over just epoxy sized carbon fibers alone.

In a particularly preferred embodiment of the present invention the process for manufacturing the CF-SMC includes providing a resin system including vinyl ester resin (e.g., Arotran™ 300, fully formulated vinyl ester resin based system available from Ashland, Inc., Dublin, Ohio) and PMDI (e.g., Mondur™ MR, polymeric methylene diphenyl isocyanate (PMDI) available from Covestro LLC, Pittsburgh, Pa.). In addition, providing a predetermined carbon fiber with vinyl ester sizing, preferably 72 sized carbon fiber with vinyl ester sizing (e.g., Panex® 35 Continuous Tow (50K) Sizing 72 carbon fiber with vinyl ester sizing material available from Zoltek Companies, Inc. St. Louis, Mo.) and carbon fiber with epoxy sizing, preferably 11 sized carbon fiber with epoxy sizing (e.g., Panex® 35 Continuous Tow (50K) Sizing 11 carbon fiber with epoxy sizing material available from Zoltek Companies, Inc. St. Louis, Mo.). The CF-SMC is manufactured by first producing the resin system by operably mixing a predetermined amount of the vinyl ester resin and the PMDI (e.g., preferably, about 90 parts by weight of vinyl ester resin and about 10 parts by weight of PMDI are mixed; most preferably, 95 parts by weight of vinyl ester resin and 5 parts by weight of PMDI are operably mixed). Carbon fiber filaments are operably processed by a cutter, e.g., Brenner® cutter, to a fiber length of predetermined length, e.g., generally, 0.5 to 2 inches, typically, 1 to 2 inches, preferably, 1 inch. The carbon fiber material is operably added to the resin system mixture at a predetermined level, e.g., generally 35 to 65% by weight, typically 40 to 60% by weight, preferably 45 to 55% by weight, most preferably, 50% by weight. Most preferably, 50% by weight resin and 50% by weight 1 inch carbon fiber material is used.

The resultant composition has a flexural strength of about 350 to 500 Mpa and flexural modulus of about 25 to 30 Gpa, preferably, the flexural strength is at least 460 Mpa and the flexural modulus is at least 27 Gpa. The composition also has a tensile modulus of about 32 to 40 Gpa and tensile strength of about 200 to 325 Mpa, preferably tensile modulus of at least 35 Gpa and tensile strength of at least 275 Gpa.

Example 1

Shielded Sheet Molding compositions are made containing 40% 45%, 50%, 55% and 60% Sheet molding composition with the remainder carbon fibers 1 inch to about 3 inches long having 40% epoxy sizing to 60% epoxy sizing and 60% vinyl ester sizing to 40% vinyl ester sizing and ranging from 0.5 mm to 10 mm thick and 1 mm to 2 mm thicknesses. Decibel reductions are found to be 65-85 over a frequency range of 1000 Mhz to 2000 Mhz. Sheets and parts are formed of the material and cured at a temperature of about 150 degrees C. The parts are found to have superior mechanical properties verses carbon fiber with those using only epoxy sizing or carbon fiber with vinyl ester sizing. It is also contemplated that the parts are effective in electro-magnetic shielding of parts in an electric and hybrid vehicle.

Comparative Example 1

Testing was performed on an epoxy sized carbon fiber formulation. The resin was produced by mixing 5 parts by weight of the Arotran™ 300 fully formulated vinyl ester resin with 5 parts by weight of Mondur™ MR PMDI. Only Panex® 35 with 11 Sizing, 50K carbon fiber with epoxy sizing was used. The carbon fiber filaments were processed by a cutter for a fiber length of nominal 1 inch, and added to the resin system at a level of 50% by weight (i.e., 50% by weight resin, 50% by weight 1 inch carbon fiber). After CF-SMC maturation for 48 hours at 28° C., the CF-SMC was molded in a plaque tool at 150° C., with a demold time of 3 minutes to prepare plaques for mechanical property testing.

The properties of the resulting composition are set forth below in Table 2:

TABLE 2

| Properties of CF-SMC with 50% Panex ® 35 with 11 Sizing: | |
|---|---|
| Tensile Modulus | 30 GPa |
| Tensile Strength | 99 MPa |
| Flexural Modulus | 23 GPa |
| Flexural Strength | 265 MPa |

Example 2

Inventive example 2 substituted the 50% of the employed carbon fiber with a carbon fiber sized specifically for vinyl ester, namely Panex® 35 Zoltek 72 sized carbon fiber. The amount of the carbon fiber in the CF-SMC material was 50% by weight. The 50% by weight of carbon fiber had 25% 11 size epoxy sizing carbon fiber and 25% 72 size vinyl ester carbon fiber. The resin was produced by mixing 5 parts by weight of the Arotran™ 300 fully formulated vinyl ester resin with 5 parts by weight of Mondur™ MR PMDI. In addition to 25% Panex® 35 with 11 Sizing, 50K carbon fiber with epoxy sizing, the carbon fiber also had 25% Panex® 35 with 72 Sizing, 50K carbon fiber with vinyl ester sizing. The carbon fiber filaments were processed by a cutter for a fiber length of nominal 1 inch, and added to the resin system at a level of 50% by weight (i.e., 50% by weight resin, 50% by weight 1 inch carbon fiber where the 50% was a 50/50 mixture of the 11 sizing and the 72 sizing). After CF-SMC maturation for 48 hours at 28° C., the CF-SMC was molded in a plaque tool at 150° C., with a demold time of 3 minutes to prepare plaques for mechanical property testing.

The mechanical properties were significantly better. The properties of the resulting composition of Example 2 is set forth in Table 3.

TABLE 3

| Properties of CF-SMC with 25% Panex ® 35 with 11 Sizing and 25% Panex ® 35 with 72 Sizing: | |
|---|---|
| Tensile Modulus | 35 GPa |
| Tensile Strength | 275 MPa |
| Flexural Modulus | 27 GPa |
| Flexural Strength | 460 MPa |

Example 3

CF-SMCs are made containing 35%, 40%, 45%, 50%, 55%, 60% and 65% by weight SMC with the remainder carbon fibers having 17%, 20%, 22%, 25%, 27%, 30%, 32% by weight epoxy sizing and 17%, 20%, 22%, 25%, 27%, 30%, 32% by weight vinyl ester sizing, the carbon fibers being cut to a length of about 0.5 to about 2 inches long to about 0.5 inch to about 1 inch long and the resin system containing from about 90 parts to 95 parts by weight of a vinyl ester and from about 10 parts to 5 parts by weight of a polymeric methylene diphenyl isocyanate. Sheets and parts are formed of the material and cured at a temperature of about 150 degrees C. The compositions are found to have suitable mechanical properties of flexural strength from about 350 to 500 Mpa, flexural modulus from about 25 to 30 Gpa, tensile modulus from about 32 to 40 Gpa, and tensile strength from about 200 to 325 Mpa.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A carbon fiber sheet molding composition, comprising:
from about 35% to 65% by weight of a sheet molding composition (SMC) filled with about 45% to 55% by weight of carbon fiber comprising about a 50/50 mixture of epoxy sized carbon fiber and vinyl ester sized carbon fiber for providing the carbon fiber sheet molding composition with predetermined mechanical properties, wherein the predetermined properties include flexural strength of about 350 to 500 Mpa, flexural modulus of about 25 to 30 Gpa, and a tensile strength of at least 275 Mpa.

2. The carbon fiber sheet molding composition of claim 1, wherein the flexural strength includes at least 460 Mpa to 500 Mpa.

3. The carbon fiber sheet molding composition of claim 1, wherein the predetermined mechanical properties also include tensile modulus of about 32 to 40 Gpa.

4. The carbon fiber sheet molding composition of claim 1, wherein carbon fiber filaments of the carbon fiber are from about 0.5 inch to about 2 inches in length in the sheet molding composition and are distributed randomly.

5. The carbon fiber sheet molding composition of claim 1, wherein the carbon fiber is found in the carbon fiber sheet molding composition in an amount of 50% by weight.

6. The carbon fiber sheet molding composition of claim 1, wherein a resin of the sheet molding composition is found in the carbon fiber sheet molding composition in an amount from about 45% to 55% by weight.

7. The carbon fiber sheet molding composition of claim 6, wherein the resin is manufactured from about 95 parts by weight of a vinyl ester and about 5 parts by weight of a polymeric methylene diphenyl isocyanate.

8. The carbon fiber sheet molding composition of claim 1, wherein a resin is found in the carbon fiber sheet molding composition in an amount from about 45% to 55% by weight, and wherein the carbon fiber, which is about 1 inch in length carbon fiber, is found in the carbon fiber sheet molding composition in an amount from about 45% to 55% by weight.

9. The carbon fiber sheet molding composition of claim 1, wherein the carbon fiber is a 50K filament fiber manufactured from a polyacrylonitrile precursor.

10. The carbon fiber sheet molding composition of claim 1, wherein the carbon fiber is about 25% by weight epoxy sized carbon fiber and about 25% by weight vinyl ester sized carbon fiber.

11. The carbon fiber sheet molding composition of claim 1, wherein the carbon fiber is a 50K filament fiber manufactured from a polyacrylonitrile precursor having a tensile modulus of at least about 242 Gpa and a tensile strength of at least about 4137 MPa.

12. A carbon fiber sheet molding composition, comprising:
from about 45% to 55% by weight of a sheet molding composition (SMC) filled with about 55% to 45% by weight of a carbon fiber, said carbon fiber comprising about a 50/50 mixture of epoxy sized carbon fiber and vinyl ester sized carbon fiber for providing the carbon fiber sheet molding composition with predetermined mechanical properties, wherein the predetermined mechanical properties include a flexural strength of at least about 460 Mpa, a flexural modulus of about 25 to 30 Gpa, and a tensile strength of at least about 275 Mpa.

13. The carbon fiber sheet molding composition of claim 12, wherein the carbon fiber mixture is about 25% by weight epoxy sized carbon fiber and about 25% by weight vinyl ester sized carbon fiber.

14. The carbon fiber sheet molding composition of claim 12, wherein the carbon fiber is a chopped carbon fiber having a length of about 0.5 to 2 inches.

15. A carbon fiber sheet molding composition, comprising:
from about 40% to 60% by weight of a sheet molding composition (SMC) filled with about 60% to 40% by weight of a carbon fiber, said carbon fiber comprising a mixture of from about 20% to 30% by weight of epoxy sized carbon fiber and from about 20% to 30% by weight of vinyl ester sized carbon fiber for providing the carbon fiber sheet molding composition with predetermined mechanical properties, wherein the predetermined mechanical properties include a flexural strength of at least about 460 Mpa and a tensile strength of at least about 275 Mpa.

* * * * *